United States Patent [19]

Scott

[11] 4,413,775
[45] Nov. 8, 1983

[54] WATER HEATER CONTROL SYSTEM

[76] Inventor: Kenneth W. Scott, 601 9th St., Coronado, Calif. 92118

[21] Appl. No.: 397,628

[22] Filed: Jul. 12, 1982

[51] Int. Cl.³ .......................... F23N 1/08; F24H 1/00
[52] U.S. Cl. .................................. 236/20 R; 236/47; 219/330; 219/334
[58] Field of Search ............... 236/47, 20 R; 126/351, 126/362; 219/330, 334, 508

[56] References Cited

U.S. PATENT DOCUMENTS 4,166,944  9/1979  Scott ................................ 236/47 X
4,336,902  6/1982  Neal ................................. 236/47 X

*Primary Examiner*—William E. Wayner
*Attorney, Agent, or Firm*—Ralph S. Branscomb

[57] ABSTRACT

A water heater control system designed to conserve energy, in part by anticipating hot water demand as a function of usage, utilizes refined design features to effectively automatically switch the water heater's thermostat between a high and a low setting in response to actual use of hot water and the heat of the water at the moment. The basic purposes of the invention are first, the prevention of the system from switching into the "high" mode when in fact adequate hot water is still present in the tank, and second, the reduction of the length of the burner firing time at times when a long burn is not necessary. These features include a specialized heat sensor switch which permits the trigger temperature of the switch to follow the seasonal temperature of the incoming water, also a stack gas switch for further refining the system's function. Remote control and a special mounting means are also included in the refined control system.

9 Claims, 7 Drawing Figures

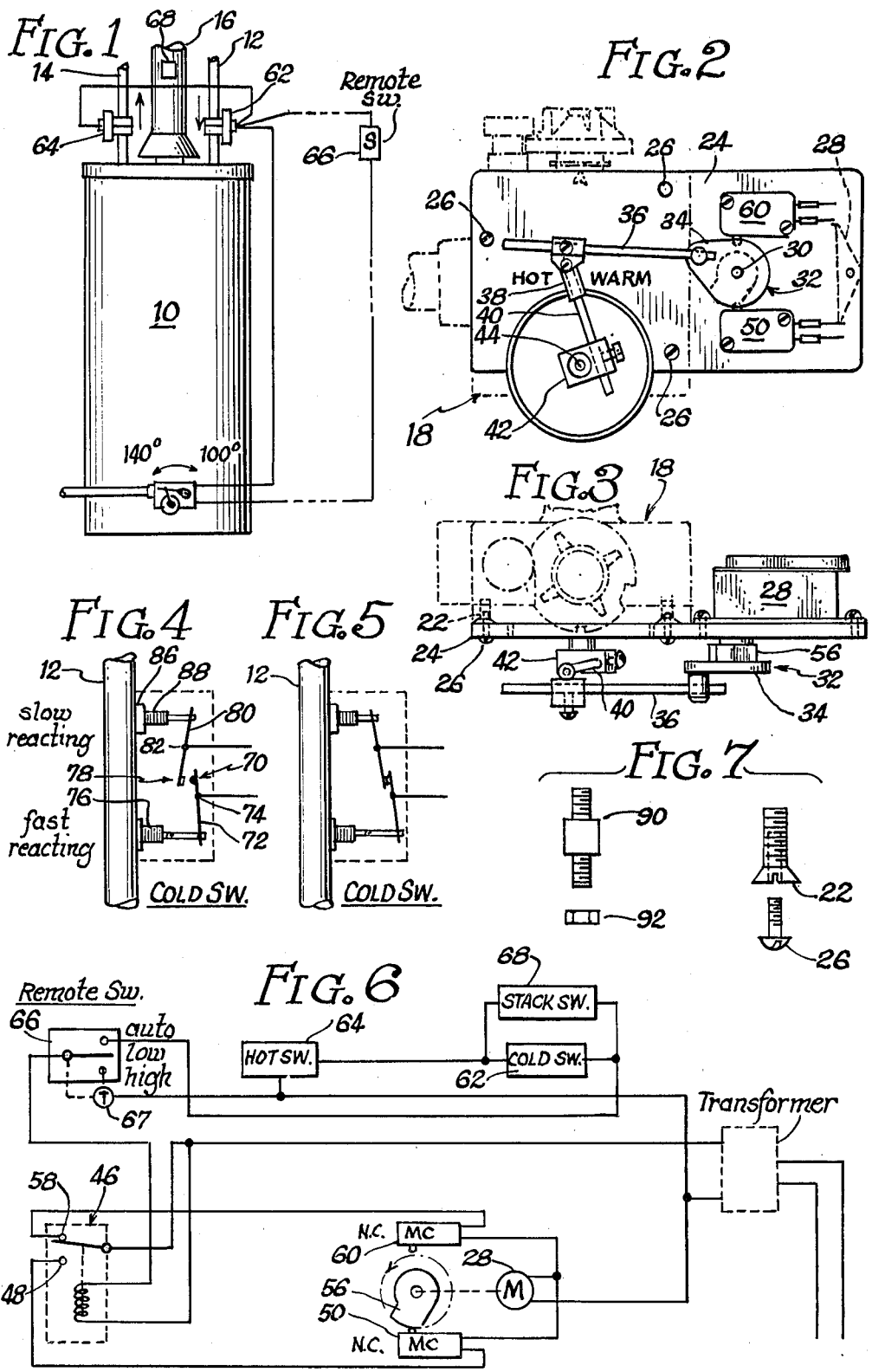

WATER HEATER CONTROL SYSTEM

BACKGROUND OF THE INVENTION

The invention relates to hot water heater control systems and more particularly to a means for regulating the temperature at which the thermostat of the heater is set in response to the actual need or demand for hot water. During periods of low use, heat energy is wasted if the temperature of the water in the storage tank remains at a high level. For example, a temperature of 125° is adequate for all ordinary purposes, and a higher temperature does not ordinarily result in a higher temperature of the water actually used, but merely means that the user will mix more cold water with the hot water for showering, washing hands, and dishes in the sink, etc.

Therefore, a system which would actually lower a setting of the thermostat during periods of low use, and raise it during high utilization times would save energy and would not cause any inconvenience to the family using the water, in a residential situation with a home water heater. Such a system was designed by the instant inventor and is the subject of U.S. Pat. Nos. 4,016,402 and 4,166,944. The system set forth in U.S. Pat. No. 4,166,944 utilizes two temperature sensing switches in series, one mounted on the outgoing hot water pipe and the other mounted on the incoming cold water pipe. The temperature of the cold water pipe adjacent the heater reservoir or tank is cold when water is being used because cool, fresh water is being drawn into the tank. Once the flow stops, however, hot water from the tank through convection rises into the incoming water line, heating it up. Therefore, a temperature sensor switch can recognize a period of utilization by sensing the incoming water temperature, which will fall when water is used.

The switch on the outgoing hot water tank senses a condition in which the heat of the water in this tank is already above a certain point, so that despite present demand for the water, there is no need for a "burn."

Although the system described by the above-mentioned patents works well and does save significant energy, further testing and operational experience has revealed areas wherein improvements to the system can be made. For instance, the system as described in those patents under certain circumstances may rotate the thermostat unnecessarily to the high setting in response to brief, limited demand for hot water. Such a rotation might well be appropriate for periods of continuing demand, such as when using laundry equipment or a dishwasher, but are wasteful when only a short demand period is experienced by the system.

SUMMARY OF THE INVENTION

The instant invention fulfills the above stated need by incorporating several refinements into the control system so that thermostatic rotation is more accurately controlled as a function of usage.

One added feature is an addition temperature sensing switch on the stack of a gas burning water heater. This switch overrides the cold water sensing switch so that whenever the unit is turned on to high, it remains on high until the water temperature achieves a certain level irrespective of usage in order to stabilize the system.

Another feature is a remote control switch with would permit a person in the bedroom or kitchen, etc., to bypass the system and put the heater directly into its high or low thermostat setting.

The prior device as mentioned above utilizes a heat sensor switch on the incoming fresh water pipe. Because this switch is at a set temperature, that is it closes when the temperature drops beneath a set temperature, it cannot follow the seasonal changes of temperature in the incoming water. Therefore, it must be manually set. The new system described herein utilizes a special switch whose unique design enables it to actually follow or track ambient water temperature in an indirect way over a wide range, in effect setting the threshold temperature from 5° to 10° above the seasonal temperature, whatever it might be.

Periods of short, intermittent hot water usage cause the cold water pipe switch to close and open rapidly, rotating the thermostat dial a number of times in just a few minutes. Thus, another feature of the invention is a switching cam having an extensive camming surface which must be rotated a number of degrees before the mode of the thermostat is reversed.

The system is designed to respond to demand for heated water, to eliminate excessive overheating of water, to eliminate firing the gas burner in instances where sufficient hot water is already in the water heater storage tank, and to shorten the time the burner remains on when adequate heated water has been produced, all in the interest of greater water heater efficiency for maximum energy conservation.

In addition, in order to accommodate the household market for which the unit is intended, a specialized mounting plate is provided with tapped screws which enable the user to install the unit over the existing thermostat and valve without removing the face plate, and therefore not jeopardizing the integrity of the gasket beneath the face plate.

BRIEF DESCRIPTION OF THE DRAWINGS

FIG. 1 is a front elevational view of a water heater with the system in place;

FIG. 2 is a front elevation view of the thermostat and valve of the water heater with the control in place;

FIG. 3 is a top elevation view of the control showing the thermostat in phantom;

FIG. 4 is a diagrammatic view of the cold water line switch in the open position;

FIG. 5 is a view similar to FIG. 4 but showing the switch in closed position;

FIG. 6 is a schematic of the wiring in the system; and

FIG. 7 illustrates the fasteners that are utilized to mount the unit to an existing thermostat and valve.

DETAILED DESCRIPTION OF THE PREFERRED EMBODIMENT

A typical gas-fired hot water heater is shown at 10 with incoming cold water pipe 12 and outgoing hot water line 14, an exhaust gas stack 16 and thermostatically controlled valve 18. The thermostat and valve have a face plate 20 which is held on the thermostat with screws. In the preferred method of mounting the control unit the existing screws are removed one at a time and replaced with tapped screws 22 so that the mounting plate 24 of the control unit can be simply attached over the face plate with screws 26. Alongside the thermostat a small motor 28 is mounted. This motor has a slow rotational speed, such as one RPM in the current model. A shaft 30 extends from the motor through the mounting plate and on it is engaged a rotor 32 which is a combination cam and eccentric as can be seen from FIG. 3.

The eccentric, indicated at 34, drives the pivotally connected connecting rod 36 which, through the adjustable connector sleeve 38, rotates rod 40. This lever has an adjustable clamp 42 which rotates the dial shaft 44 of the thermostat. It can thus be seen that as the eccentric 34 rotates, the thermostat is shifted between a high and a low setting. The amount of shifts can be varied by means of adjusting the set screw of the clamp 42, and of course the distance between high and low setting can be controlled through the adjustable connection of the connector 38 to the rod 36.

The cam portion of the rotor 32 is visible in FIG. 3 but is best understood by reference to FIG. 6. A relay 46 is actuated when a signal is received from the control switches, described below, indicating that the system is to shift into the high temperature setting. In this instance, power is applied by the relay through contact 48 to the lower micro-switch 50, which is normally closed, thus powering the motor 28. As the cam rotates, however, the bearing surface 56 of the cam comes in contact with the actuator for the micro-switch as shown in FIG. 6. This opens the micro-switch, terminating the rotation of the motor, the cam, and thus the eccentric. When the motor stops, the temperature setting on the thermostat is in the hot position as indicated in FIG. 2.

When the voltage that was applied across the solenoid to set the thermostat in its hot position stops, meaning that the control switches are telling the thermostat to move back to the low setting, the same sequence of events occurs, but through contact 58 and the upper microswitch 60. Rotation of the motor is started to turn the system 180° so that the lever 40 is shifted to the right in FIG. 2, setting the system into its lower, or "warm" setting.

It can be seen from an examination of FIG. 6 that because the motor has a slow cycle of about one revolution per minute, several short, intermittent signals from the control switches for the rotor to move into the low temperature setting would not be sufficient to move the elongated cam surface 56 off of the micro-switch 50. The mere extension of this cam surface to more than 20° therefore automatically builds in a discriminating function whereby the system does not move from the high setting to the low setting, or from the low setting to the high setting, unless the conditions which drive the thermo-switches remain steady for a period of time. Short, periodic hot water usage will thus not trigger the mechanism to move into its hot mode through the closing of switch 62 until a certain cumulative length of usage occurs.

The switch system itself has as its basis a first switch 62 on the cold water (inlet) pipe, and a second switch 64 on the hot water delivery pipe. The first switch 62 is the basic switch which indicates when hot water is being used. When the temperature measured by this switch drops below a certain level, the level being set at 5° to 10° above the temperature of the incoming water, switch 62 closes. This condition occurs during high use periods as cool water passes through the pipe, bringing the switch sensor down to a temperature close to that of the incoming water. Once the flow stops, the water temperature inside the pipe at the switch sensor begins to rise due to convection from the tank, until it passes above the threshold temperature of the switch, whereupon the switch opens.

The second switch 64 closed when the temperature drops below a temperature desired for hot water supplied to the faucets. This switch acts as a veto on the first switch, so that even though there is high usage the thermostat is not set to the high temperature unless in fact the water being delivered has dropped below a pre-set temperature. These switches are in series as indicated in FIG. 6, so that when remote switch 66 is set on "Auto," these switches will both be closed, and thus the relay 46 will be closed and the system shifted into the high temperature mode, when there is inflowing cold water in pipe 12 and outflowing "hot" water in the pipe 14 which is not at the desired temperature.

If switches 62 and 64 were the only switches in the control system, as long as switches 64 were closed, switch 62 would cause the burner to go on and off intermittently more often than desired in response to intermittent, frequent use of hot water as opposed to a long, continuing use despite the use of the expanded cam surface 56. To resolve this problem, an optional switch 68 maybe applied to the stack, this switch being open until the temperature reaches a temperature on the order of 150° F., indicative that the burner is on. This occurs about 75 seconds after the burner is ignited. After this time the switch closes, so that once the system is shifted into its high temperature mode, intermittent stopping of the demand would be ineffective to switch the system back into the low mode until the temperature of water delivered, sensed by switch 64, reached the desired pre-set level, for example 125° F. Once this temperature is reached switch 64 opens, shifting the system into its low temperature mode, which ordinarily would cause the burner to cease burning, and shortly bring the switch 88 into its open mode. This switch could also be arranged such that when set at "high," it will automatically drop to "low," either after passage of a pre-determined time, or in response to the water temperature reaching a pre-determined level. When set on "low," however, the switch should remain at the low setting until manually changed.

The remote switch 66 would ideally be located in a convenient place in the house or building. For normal operation it would be kept in the "Auto" position, and shifted into the low or high position for special circumstances. An examination of the circuit, FIG. 6, will indicate that some of the control mechanism would be by-passed when the system is directly placed in either the low or high mode position. The remote switch would remain in the low position until manually shifted into either high or "Auto." When the remote switch is placed in the high position, it would automatically reset to the "Auto" position by timer 67 after a period of time.

Although switch 62 could be a simple temperature sensor switch, variable water temperature causes a problem. "Seasonal" water temperature, used in this specification and claims to denote the temperature of the water as it comes into the pipe 12, varies considerably from time to time, generally seasonally, so that it may be within a range as great as about 40° in the worst case. Because the switch 62 should close when the water temperature drops to within about 10 degrees of the seasonal temperature, naturally it must be set to accommodate the highest temperature, causing it to activate too quickly in the winter and too slowly in the summer until re-adjusted periodically. To avoid this, switch 62 is a specially designed switch shown in FIGS. 4 and 5. Its "stationary" contact 70 is actually mounted on a pivotal lever 72 pivotal about a fulcrum 74 and actuated by the thermal expanding element 76. Any other mechanism which would cause the "stationary"-contact to move as a function of temperature as described herein could also be used for the contact mover.

The "moving" contact 78 is similarly mounted on a lever 80 fulcrumed at 82 and operated on a thermal expansion element 84. However, this contact also utilizes a heat sink 86 to slow down its motion. As a result, taking the example of a sudden inrush of cold water, contact 70 will quickly move away from contact 78 in response to the coldness, so that rather than being instantly turned on, the switch remains open for a while until contact 78 catches up. This slows the action of the switch in cold weather, and the corresponding case can be illustrated for speeding the action of the switch in hot weather. Also, when the water within the pipe heats, because the fulcrum 74 is closer to the contact point than the fulcrum 82, as the system heats contact 70 will tightly follow contact 78 down to the limit of its throw, subsequent to which the "moving" contact 78, because of its longer sweep, will move clear of the stationary contact a safe distance to avoid arcing. Also, the longer sweep insures that the moving contact will always be able to catch up with the stationary contact.

The system may be run from a transformer indicated in FIG. 6 at about 24 volts. Also, as indicated in FIG. 7 at 88, the mounting plate 24 can be connected to the face plate of the thermostat with a double-ended bolt 90 which replaces the tapped screws 22 to engage the mounting plate with the nuts 92.

Variations of the system would include the incorporation of solid state devices in the circuit, particularly to replace the solenoid 46 with a solid state switch, possibly printed circuitry and even micro-processor technology. This would of course involve the incorporation of a rectifier, so that such changes at this point in time are not deemed to be advantageous, but future developments might provide cause for rethinking the design. Also, as mentioned above, some other type of temperature sensor/reactor, such as a thermistor, could be used in place of the thermoswitch, with the appropriate re-design of the circuit. The term "switch" as used in this specification and claims is intended to refer broadly to any device which affects electric current as a function of temperature, with a switching action or otherwise, to respond electrically to temperature changes at the sensed points.

The rotor 32 could make and break connections in the circuit by itself being a switch contact by virtue of a band of copper or the like wrapped arouhd the cam and contacting brushes in its rotation to make and break the circuits. This would of course require re-design of the circuit unless a void is incorporated in the copper band where the cam surface 56 now lies to preserve the normally closed nature of the switches 50 and 60 that would be replaced by the cam-brushes switching system.

In summary, the refinements disclosed and claimed herein control the number of "burns" of the heater in three ways: first, the enlarged angular surface 56 of the cam; second, with the addition of the stack-switch 68; and third, by the utilization of the specialized switch 64 which essentially tracks seasonal water temperature. In addition, the remote switch 66 can be used to shut the system on low when the user is on vacation, or set it on high when returning from a vacation, or when guests are spending time in the house and additional water would be required. It should be emphasized that when the setting is in the "hot" mode, in effect the householders are provided with more hot water, inasmuch as they can mix more cold water with the hot water to achieve their proper temperatures for bathing, etc.

Lastly, the feature of convenience is emphasized, especially considering the retrofit nature of the unit, by the providing of the tapped screws 22, or in the alternative the nuts and bolts 92, so that the unit ideal for the consumer market, and very closely approaches perfection in its functionality.

While the preferred embodiment of the invention has been described, other modifications may be made thereto and other embodiments may be devised within the spirit of the invention and scope of the appended claims.

What is claimed is:

1. A control for a thermostat for a water heater or the like having an incoming fresh water line, an outgoing hot water line, a heating means and a thermostatic control for said heating means, said control comprising:
    (a) a first temperature sensor switch mounted on said incoming line set to close and remain closed at or below a temperature higher than incoming water temperature but lower than the temperature of standing water in said line;
    (b) a second temperature sensor switch mounted on said hot water line which is closed at and below a predetermined temperature which is in the range of desirable temperatures for hot water;
    (c) means for alternately setting said thermostat at a low setting and a high setting and a circuit actuating said means to set said thermostat at said high setting in general when both of said switches are closed, and otherwise said thermostat is set at the low setting;
    (d) retarder means for reducing the number of burns of said heating means caused by short sporadic bursts of hot water demand causing the frequent opening and closing of said first switch;
        (e) a remote switch for said contact capable of overriding said circuit to establish said thermoswitch selectably at said high and low positions; and
    (f) a timer for said remote switch operative to switch said remote switch from the high position to the "auto" position after the lapse of a pre-set time.

2. A control for a thermostat for a water heater or the like having an incoming fresh water line, an outgoing hot water line, a heating means and a thermostatic control for said heating means, said control comprising:
    (a) a first temperature sensor switch mounted on said incoming line set to close and remain closed at or before a temperature higher than incoming water temperature but lower than the temperature of standing water in said line;
    (b) a second temperature sensor switch mounted on said hot water line which is closed at and below a predetermined temperature which is in the range of desirable temperatures for hot water;
    (c) means for alternately setting said thermostat at a low setting and a high setting and a circuit actuating said means to set said thermostat at said high setting in general when both of said switches are closed, and otherwise said thermostat is set at the low setting;
    (d) retarder means for reducing the number of burns of said heating means caused by short sporadic bursts of hot water demand causing the frequent opening and closing of said first switch;

(e) said means for alternately setting said thermostat including a bi-modal solenoid in a circuit with a rotary cam operative between a pair of micro-switches which terminate the rotation of said cam until the solenoid is reversed long enough for the cam to clear the micro-switch it is contacting; and (f) said retarder means comprise an angular extension of the outer caming surface of at least 20°.

3. A control for a thermostat for a water heater or the like having an incoming fresh water line, an outgoing hot water line, a heating means and a thermostatic control for said heating means, said control comprising:

(a) a first temperature sensor switch mounted on said incoming line set to close and remain closed at or below a temperature higher than incoming water temperature but lower than the temperature of standing water in said line;

(b) a second temperature sensor switch mounted on said hot water line which is closed at and below a predetermined temperature which is in the range of desirable temperatures for hot water;

(c) means for alternately setting said thermostat at a low setting and a high setting and a circuit actuating said means to set said thermostat at said high setting in general when both of said switches are closed, and otherwise said thermostat is set at the low setting;

(d) retarder means for reducing the number of burns of said heating means caused by short sporadic bursts of hot water demand causing the frequent opening and closing of said first switch;

(e) said water heater being of the gas burning variety and having a stack for exhaust gases; and (f) said heating means being a gas burner and said retarding means comprising a third temperature sensor switch mounted on said stack and closing and remaining closed a temperature on the order of 150° F. indicative of said burner being on; and (g) said third switch being wired and parallel with said first switch to bypass same when said burner is burning.

4. A control for a thermostat for a water heater or the like having an incoming fresh water line, an outgoing hot water line, a heating means and a thermostatic control for said heating means, said control comprising:

(a) a first temperature sensor switch mounted on said incoming line set to close and remain closed at or below a temperature higher than incoming water temperature but lower than the temperature of standing water in said line;

(b) a second temperature sensor switch mounted on said hot water line which is closed at and below a predetermined temperature which is in the range of desirable temperatures for hot water;

(c) means for alternately setting said thermostat at a low setting and a high setting and a circuit actuating said means to set said thermostat at said high setting in general when both of said switches are closed, and otherwise said thermostat is set at the low setting;

(d) retarder means for reducing the number of burns of said heating means caused by short sporadic bursts of hot water demand causing the frequent and closing of said first switch;

(e) said first switch having a stationary contact and a moving contact; and (f) said retarder means comprising a terminal mover mounted in said first switch such that by moving said stationary contact of said first switch as a function of the seasonal temperature of incoming water, the moving contact will follow the seasonal temperature and close upon the temperature sensed dropping below a generally uniform temperature interval above said seasonal temperature.

5. Structure according to claim 4 wherein said terminal mover comprises a fast-acting thermal expansion element mounting said stationary contact.

6. Structure according to claim 5 wherein both of said contacts are on the ends of levers pivoted on spaced fulcrumes having a thermal expansion element on the other end, and said moving contact moves slower than said stationary contact due to the incorporation of a heat sink with the thermal expansion element of said moving contact.

7. Structure according to claim 6 wherein said moving contact and its fulcrum are proportionally further apart than said stationary contact to delay the opening of said first switch when the water in the incoming pipe heats.

8. A control for a thermostat for a water heater or the like having an incoming fresh water line, an outgoing hot water line, a heating means and a thermostatic control for said heating means, said control comprising:

(a) a first temperature sensor switch mounted on said incoming line set to close and remain closed at or below a temperature higher than incoming water temperature but lower than the temperature of standing water in said line;

(b) a second temperature sensor switch mounted on said hot water line which is closed at and below a predetermined temperature which is in the range of desirable temperatures for hot water;

(c) means for alternately setting said thermostat at a low setting and a high setting and a circuit actuating said means to set said thermostat at said high setting in general when both of said switches are closed, and otherwise said thermostat is set at the low setting;

(d) retarder means for reducing the number of burns of said heating means caused by short sporadic bursts of hot water demand causing the frequent opening and closing of said first switch;

(e) said thermal switch having a screwed-in face plate having mounting screws and a shaft for a rotary setting dial projecting therethrough;

(f) said means for alternately setting said thermostat comprising a lever arm mounting to said shaft and linked to a drive means and mounted with said drive means on a mounting plate; and (g) said mounting plate is mounted to said face plate with screws engaging screw holes tapped into the heads of mounting screws.

9. Structure according to claim 8 wherein said lever arm is linkable to said drive means at selectable different radial locations thereon to vary the throw of said arm.

* * * * *